United States Patent [19]
Klapes et al.

[11] 3,709,385
[45] Jan. 9, 1973

[54] PARTS CONVEYOR

[75] Inventors: Michael C. Klapes, Lynnfield; Herbert N. MacRae, Beverly, both of Mass.

[73] Assignee: Delta Engineering Corporation, Winchester, Mass.

[22] Filed: Aug. 5, 1971

[21] Appl. No.: 169,354

[52] U.S. Cl. ............ 214/17 C, 212/40, 212/66, 214/1 BH, 214/658, 294/65.5
[51] Int. Cl. ................................................ B66c 23/84
[58] Field of Search ........ 214/1 BC, 1 BH, 17 C, 151, 214/309, 658; 294/65.5; 212/40, 66

[56] References Cited

UNITED STATES PATENTS

| 2,615,746 | 10/1952 | Fischer | 294/65.5 |
| 2,733,824 | 2/1956 | Ruppe | 294/65.5 X |

*Primary Examiner*—Robert G. Sheridan
*Attorney*—Robert J. Schiller et al.

[57] ABSTRACT

The invention is a conveyor for picking up parts from a supply station and transferring them to a parts delivering station or point of use. The conveyor comprises a pivotally mounted arm with pulleys supporting a cable from which depends a permanent magnet parts holder. Winch means comprising a motor and a reel connected to the cable are used to raise and lower the parts holder, and the cable and arm are so connected that winding and unwinding of the cable effects pivotal movement of the arm between the parts supply station and the parts delivering station.

11 Claims, 7 Drawing Figures

PATENTED JAN 9 1973

INVENTOR.
MICHAEL C. KLAPES

BY Schiller & Pandiscio

ATTORNEYS

INVENTOR.
MICHAEL C. KLAPES
BY
Schiller & Pandiscio
ATTORNEYS

INVENTOR.
MICHAEL C. KLAPES
BY Schiller & Pandiscio
ATTORNEYS

PARTS CONVEYOR

This invention relates to conveyor apparatus and more particularly to a magnetic loading conveyor.

In many industries it is desirable to employ conveyor means for transporting parts to assembly equipment, processing apparatus, feeding equipment, packaging machines, and the like. Typically, to reduce labor costs and eliminate worker fatigue, it is desirable to employ a conveyor for lifting parts from a supply container to a parts feeder such as a vibrating bowl feeder. Essential requirements of such conveyor equipment are reliability, relatively low cost, and automatic operation. Heretofore there has been available conveying equipment for such purposes which employs either an electromagnet or a permanent magnet for lifting and conveying ferrous and other magnetic parts. However, electromagnetic conveyors suffer from a number of limitations, notably, relatively high cost. Permanent magnet conveyors heretofore available have been limited by relatively high cost, fixed limits of operation, excessive conveyor size to capacity ratio, and design considerations which limit potential uses of the equipment.

The primary object of this invention is to provide a new permanent magnet conveyor for lifting and transferring magnetic parts to bowl feeders, packaging equipment and the like which is adapted to be added to or used in conjunction with existing manufacturing equipment such as bowl feeders, packaging machines, etc., is a self-contained unit that may be shipped completely assembled and is characterized by simplicity of design, relatively low manufacturing cost and reliability of operation.

A further object of the invention is to provide a new magnetic conveyor for loading parts into a machine which occupies relatively little space, can operate repetitively through complete cycles, is adapted to be controlled automatically according to demand, and embodies a basic design such that it can be manufactured in various sizes.

Still a further object of the invention is to provide a conveyor of the type that employs a permanent magnet for lifting parts which is characterized by a height compensating feature which permits supply containers to be placed at floor level or to be stacked, with changeover from one supply container to another being effected in a matter of seconds.

The foregoing and other objects of the invention described in or rendered obvious by the following detailed specification are achieved by providing a conveyor which essentially comprises a conveyor arm, means pivotally supporting the conveyor arm for swinging movement in a horizontal plane, a flexible cord or cable having a permanent magnet parts-loading assembly connected to one end, means mounting the cable to the conveyor arm and the support for said arm so that swinging movement of said arm causes swinging movement of said magnetic assembly, and means for winding and unwinding the cord so as to raise and lower the height of the magnet assembly. The cable is arranged so that it exerts a force on the conveyor arm which urges the conveyor arm in a first direction about its pivot point. Additional biasing means are provided for urging the conveyor arm to move in a second opposite direction about its pivot point. The means mounting the cord and the conveyor arm are also arranged so that, depending upon the position of the conveyor and the extent to which the cord has been wound or unwound, the conveyor arm will either move relative to its pivot point or will remain stationary as the cord is being wound or unwound. The permanent magnet parts-loading assembly is adapted to pick up parts magnetically and to discharge them when the tension on the cord exceeds a predetermined limit.

Other features of the apparatus are described in the following specification which is to be considered together with the accompanying drawings wherein.

Figure 1:
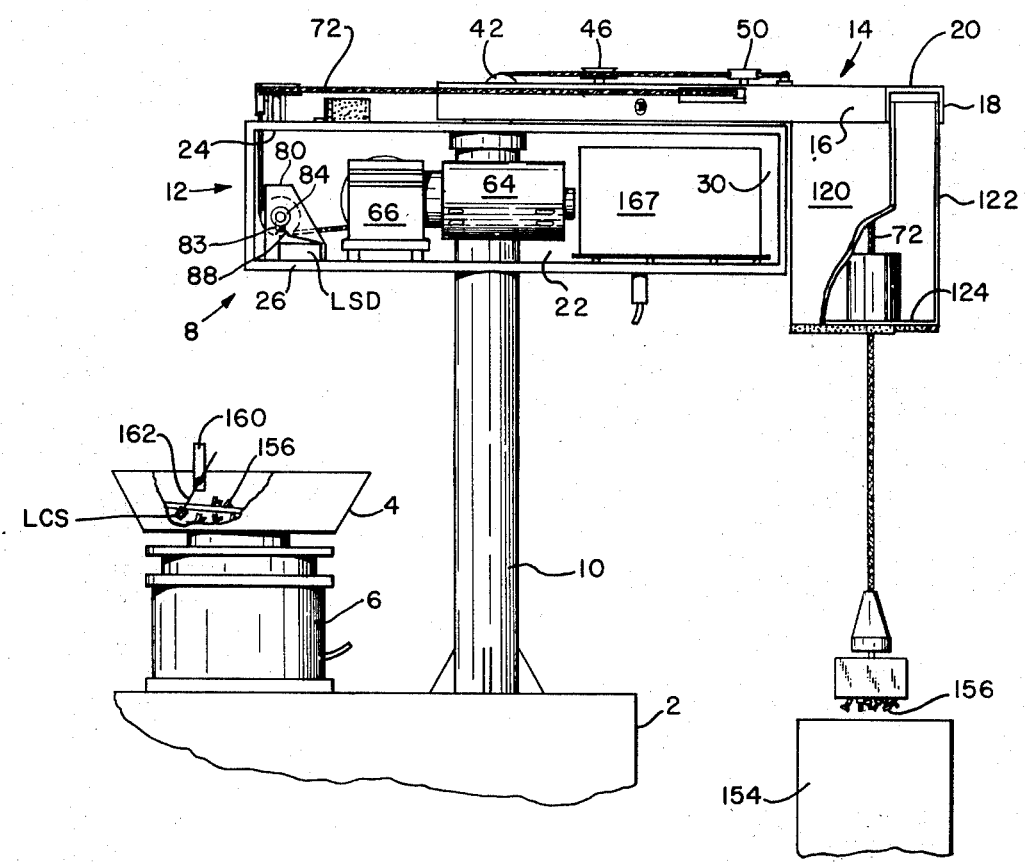
FIG. 1 is a front elevational view partly in section of a conveyor constructed in accordance with the present invention mounted on a machine having a vibrating bowl feeder.

A conveyor constructed in accordance with the present invention is designed to lift parts of ferrous and other magnetic materials from one place and deposit them in another place. A primary field of the use is in removing parts from a storage bin or shipping container and depositing the same in a hopper or feeder mechanism associated with some form of production equipment. Referring now to FIG. 1, the illustrated conveyor apparatus is associated with a machine, a portion of which is shown at 2 which is supplied with parts from a bowl feeder 4 that is mounted on a vibrator 6. By way of example, the machine 2 may be an article counting machine of the type illustrated and described in U.S. Pat. No. 3,573,477 of Michael C. Klapes, issued Apr. 6, 1971 for RADIATION SENSITIVE APPARATUS FOR DETECTING CONVEYED ARTICLES.

The conveyor comprises a hollow column 10 which is mounted on the machine 2 or alternatively may be mounted on a stand or other support which is separate from the machine 2. The column 10 supports a rectangular enclosure 12 containing elements hereinafter described and also an arm 14 which in the illustrated embodiment is constructed of a U-shaped channel member having side walls 16 and 18 and a horizontal connecting wall 20. The enclosure 12 comprises a rear wall 22 and top and bottom walls 24 and 26. The side and front of the enclosure 12 are formed with large apertures 28 and 30 (see FIGS. 1 and 2) which permit access to the components contained within the enclosure 12 and which are normally covered by removable cover panels (not shown).

Figure 5:
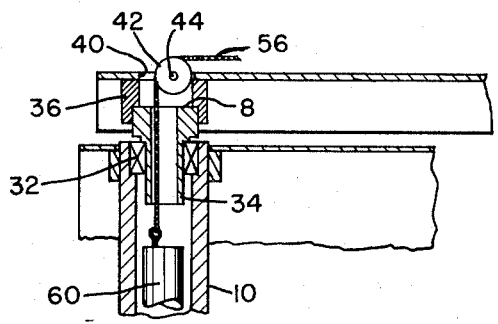
FIG. 5 is a fragmentary sectional view in elevation showing how the arm is pivotally supported.

The arm 14 may be pivotally connected to the column 10 in a variety of ways known to persons skilled in the art. One suitable mode of connecting the arm 14 to the column 10 is shown in FIG. 5. The column 10 extends through suitable aligned openings in the top and bottom walls of the enclosure 12, and these walls are welded to column 10 so that the housing 12 is rigidly supported by the column. Mounted within the upper end of the column 10 is a conventional roller bearing unit 32. The outer race of the roller bearing unit 32 is secured to the column 10 while its inner race is secured to a hollow stub shaft 34 that is mounted within the bearing unit. The arm 14 is provided with a cylindrical sleeve 36 that is welded to the underside of its horizontal wall 20. The sleeve 36 fits down over and is releasably secured to the stub shaft 34 so that the stub shaft and the arm 14 can rotate as a unit relative to the column 10.

Figure 2:
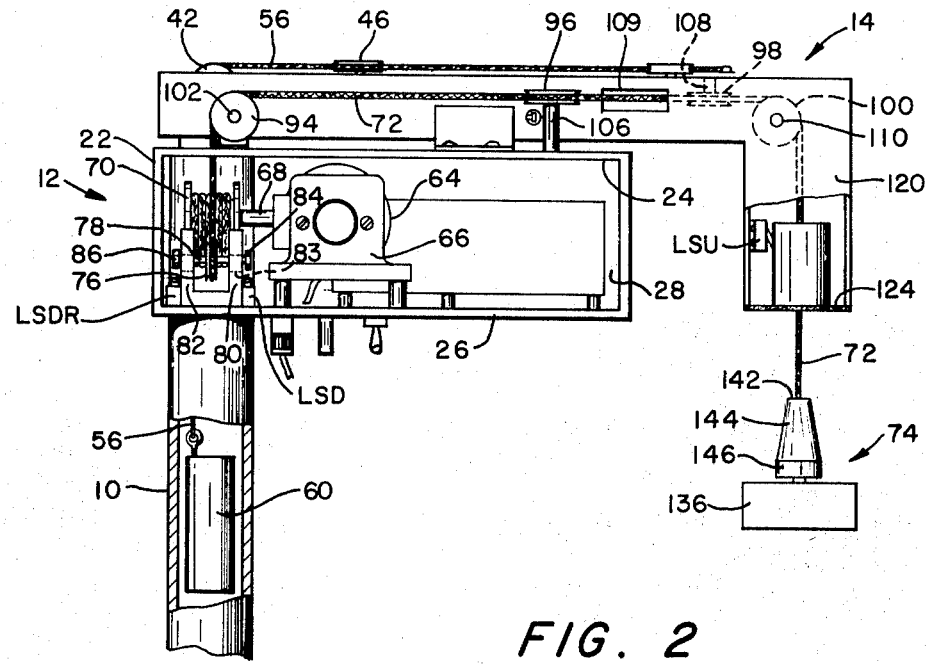
FIG. 2 is a side elevational view, partly in section, of the same apparatus with the conveyor arm at about the midpoint of its swing.
Figure 3:
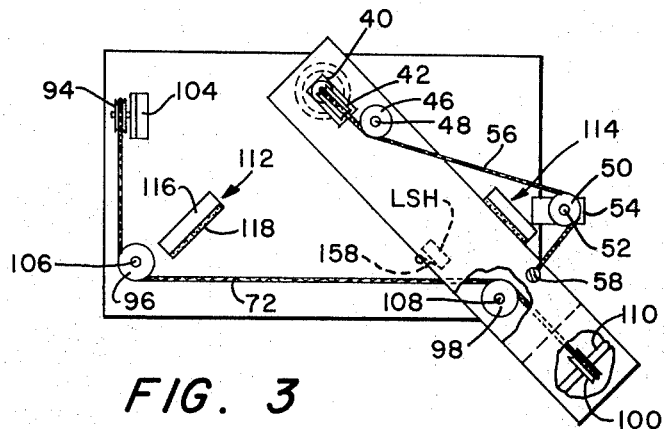
FIG. 3 is a plan view of the same conveyor on a reduced scale.

Referring now to FIGS. 1-3 and 5, the arm 14 is provided with a rectangular opening 40 to accommodate a pulley 42 that is rotatably mounted on a horizontal pulley shaft 44 that is mounted in suitable bearing blocks (not shown) that are attached to the underside of the wall 20 of the arm 14. As seen in FIG. 3, a second pulley 46 is rotatably mounted on a vertically extending pulley shaft 48 that is secured to the arm 14 at a point adjacent to its pivot point. A third pulley 50 is rotatably mounted on a pulley shaft 52 that is vertically mounted to a supporting plate 54 that is rigidly secured to the upper wall 24 of the housing 12. The pulleys 42, 46 and 50 serve to guide a flexible cord or cable 56 which has one end secured to the arm 14 at a convenient point as shown at 58. The other end of the cord 56 extends down through the hollow stub shaft 34 and into the hollow column 10. This other end of cord 56 is attached to and supports a counter-weight 60 that is disposed within column 10. It is believed to be apparent that the counter-weight 60 acts through the cord 56 to urge the arm 14 to pivot in a counterclockwise direction as seen in FIG. 3.

Disposed within the enclosure 12 and attached to its bottom wall 26 is a conveyor drive mechanism comprising an A.C. electric motor 64 and a gear reduction unit 66. The gear reduction unit 66 is coupled to and driven by the output shaft of motor 64. The gear reduction unit 66 has an output shaft 68 on which is secured a reel 70. Connected to reel 70 is a second flexible cable or cord 72. The opposite end of cable 72 is secured to and supports a permanent magnet parts holder identified generally by numeral 74.

As seen in FIGS. 1 and 2, the enclosure 12 contains a guide pulley 76 for the cord 72. Pulley 76 is mounted on a shaft 78 which is supported by two spaced blocks 80 and 82 that are affixed to the bottom wall 26 of the enclosure. The two blocks 80 and 82 have vertically extending slots 83 which are elongate in a vertical direction and which have a horizontal dimension just large enough to permit vertical movement of the shaft 78. Mounted on the ends of the shaft 78 are two small wheels 84 and 86. Mounted adjacent to the two blocks 80 and 82 are two small switches LSD and LSDR having resilient spring operating fingers 88 (see FIG. 1) which extend below the wheels 84 and 86. When the shaft 78 moves downward in the slots 83, the wheels 84 and 86 engage the fingers 88 to actuate the switches LSD and LSDR. When the shaft 78 moves upwardly in the two slots, the wheels 84 and 86 move away from the fingers 88 so as to allow the switches to return to their normal states.

Referring now to FIGS. 1, 2, and 3, the cord 72 is guided by four additional pulleys 94, 96, 98 and 100. The pulley 94 is mounted on a shaft 102 that is affixed to a support block 104 that is attached to the upper side of the top wall 24 of the housing 12. The top wall of the housing is provided with an opening through which the cord can pass from pulley 76 to pulley 94, the pulley 94 being located directly above the pulley 74 but with its shaft oriented at a right angle to shaft 78. The pulley 96 is mounted on a shaft 106 that is vertically mounted to the top wall 24 of the housing 12. The pulley 96 is located in line with but forwardly of the pulley 94. The pulley 98 is rotatably mounted on a vertical shaft 108 which is affixed to the underside of the horizontal section 20 of the arm 14. A side opening 109 in arm 14 permits cord 72 to extend from pulley 96 to pulley 98. The pulley 100 is rotatably mounted on a shaft 110 whose ends are affixed to the side walls 16 and 18 of the arm 14. The pulley 100 is located at the forward end of arm 14, while the pulley 98 is located between the pulley 100 and the midpoint of the arm 14. As a result of the relative locations of pulleys 94, 96, 98 and 100, tension applied to the cord 72 as a result of a pulling force exerted by reel 70 will cause the arm to be urged in a clockwise direction (as seen in FIG. 3) if the magnetic parts loader 74 is restrained from moving toward the pulley 100. If sufficient tension is exerted on cord 72, the pulling force which the cord exerts on the arm 14 can offset the pulling force exerted by cord 56, with the result that the arm 14 can be made to swing clockwise.

Swinging movement of the arm 14 is limited to first and second predetermined limit positions by means of two stop assemblies 112 and 114. These stop elements comprise L-shaped brackets 116 affixed to the upper side of the top wall 24 of the housing 12, and resilient bumper pads 118 which are engaged by the side walls of the arm 14. As shown in FIG. 3, the two stops 112 and 114 are spaced so as to permit the arm 14 to swing through an angle of approximately 90°.

Referring now to FIGS. 1, 2, 4A and 4B, the free end of arm 14 is provided with a depending extension comprising a pair of side plates 120 and 122 which are affixed to the side walls 16 and 18 of the arm. The bottom ends of plates 120 and 122 are connected by a cross plate 124. Cross plate 124 has an aperture 126 substantially in the center. A cylindrical sleeve 128 is affixed to the upper side of the cross plate 124 in coaxial relation with the aperture 126. Aperture 126 and sleeve 128 are aligned with the cord 72 depending from the pulley 100. Attached to the inside surface of side plate 120 by means of a bracket 130 are two identical switches LSU and LSUR (see also FIG. 6). These switches are mounted in side-by-side relation and thus only switch LSU is visible in FIGS. 2, 4A and 4B. These switches have resilient operating fingers 132 which are connected to each other and which are provided at their ends with a rounded projection 134 which extends through a side opening in the sleeve 128.

Figure 4A:
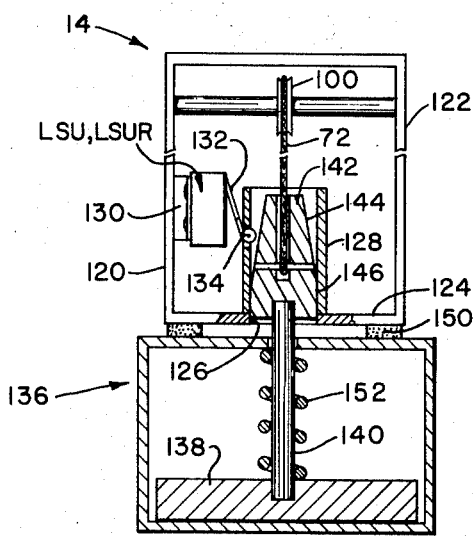
FIG. 4A is a sectional view in elevation of the front end of the conveyor arm and the permanent magnet parts holder.
Figure 4B:
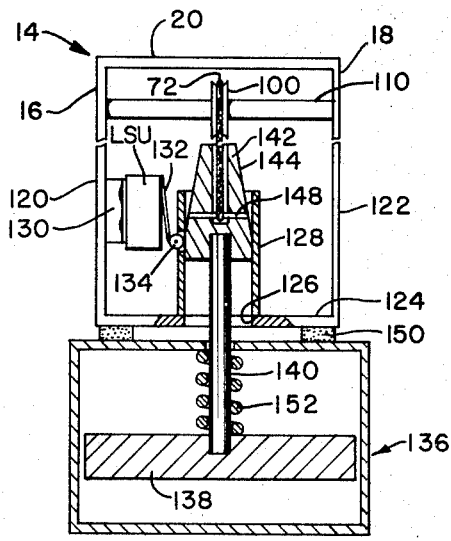
FIG. 4B is a view similar to FIG. 4 but with the permanent magnet of the parts holder in parts-releasing position.

Referring now to FIGS. 2, 4A, and 4B, the permanent magnet parts holder comprises a closed housing 136 that is made of a non-magnetic material such as aluminum or a suitable stainless steel. Housing 136 preferably is of generally rectangular cross section. Mounted within the housing 136 is a permanent magnet 138. The permanent magnet has an elongate rod extension 140 which extends through an opening in the upper end wall of the housing 136 and is connected to a plug member 142. Plug member 142 comprises two integral sections, one section having a frusto-conical surface 144 and the other section having a cylindrical surface 146. The cylindrical section 146 is sized so as to slide snugly within the sleeve 128. The cord 72 extends axially into the plug 142 through a suitable bore and is secured to a cross pin 148 that is anchored in the plug. The frusto-conical surface 144 facilitates entry of the plug into sleeve 128 as the cord 72 is wound upon reel 70.

The magnetic parts holder 74 further includes a resilient pad 150 mounted on the top side of housing 136 for engagement with the underside of the cross-plate 124 of arm 14 as shown in FIGS. 4A and 4B. A compression coil spring 152 surrounds the rod 140, with the upper end of the spring bearing against the inner surface of the upper side of the housing 136 and the bottom end of the spring bearing against the permanent magnet 138. Spring 152 is made strong enough so that it cannot compress except under a force greater than the force required to be exerted by cord 72 on arm 14 to overcome the force exerted by cord 56, i.e., the force required to cause the arm to pivot clockwise as viewed in FIG. 3. Accordingly, the spring 152 normally holds the magnet 138 against the bottom side of the housing 136. Thus if the housing 136 is lowered into engagement with a collection of parts made up of a ferrous metal or other magnetic material, the magnetic field of the magnet 138 will cause the parts to be attracted to and held against the bottom of housing 136. However, if the magnet 138 is drawn up away from the bottom of the housing as shown in FIG. 4B, the influence of its magnetic field on the parts engaging the bottom of the housing 136 will be considerably diminished, causing the parts to fall by gravity away from the housing. It is to be appreciated that other forms of permanent magnet parts holders are known to persons skilled in the art, e.g., one of the several types shown in U.S. Pat. No. 2,693,979, issued Nov. 11, 1954 to G. L. Russell for MAGNETIC DEVICE, may be substituted for the magnetic parts holder comprising housing 136 and magnet 138 illustrated in FIGS. 4A and 4B.

It is to be noted that when the housing 136 is pulled up against cross-plate 124, the plug 142 enters sleeve 128 and occupies the position shown in Fig. 4A. At this point the tapered surface 144 of the plug does not engage the projection 134 of switches LSU and LSUR. However, when magnet 138 is pulled up in housing 136, the plug 142 moves up in sleeve 128 far enough for its cylindrical surface 146 to engage the projection 134 and thereby force the fingers outwardly from the sleeve so as to actuate switches LSU and LSUR. These switches form part of the conveyor's automatic control system.

The mode of operation of the conveyor above described and illustrated will now be described with reference to FIG. 1. Assume that parts are required to be transferred to the feeder bowl 4 from a bin or a suitable shipping container, e.g., a corrugated cardboard container as shown at 154 containing a supply of steel screws 156. Assume also that the arm 14 is in the position shown in FIG. 3 with the magnet parts holder 74 dangling from arm 14 as shown in FIG. 2. At this time some of the cord 72 will be wound on the reel 70. The motor 64 is operated in a direction to cause the reel 70 to unwind cord 72 so as to lower the magnetic parts holder 74 into the container 154. The parts holder 74 is lowered far enough to engage parts in the container 154. Accordingly, since the magnet 138 will be in the position shown in FIG. 4A, a plurality of parts 156 will be magnetically attracted to and will adhere to the housing 136. Thereafter the motor 64 is operated in the reverse direction so as to cause the cord 72 to be wound up on the reel 70. As the cord 70 is being wound, the arm 14 will remain stationary due to the fact that the pulling force exerted by cord 56 is substantially greater than the pulling force exerted by the cord 72. The parts holder 74 will continue rising after plug 142 enters sleeve 128 until its resilient pad 150 engages the cross-plate 124 on the end of arm 14. Thereafter as the reel 70 continues to wind cord 72, the parts holder 74 will be held against the cross-plate 124. Since the force required to compress spring 152 is greater than that required to cause the arm 14 to pivot away from stop 114, the continued winding of cord 72 will cause the arm 14 to swing in a clockwise direction until it strikes stop 112. As seen in FIG. 3, when the arm 14 is against the stop 114, the cord 72 extends from pulley 96 at an angle of approximately 45° to the arm, so that the tension in the cord 72 can exert a turning force on the arm 14. The angle of the cord with respect to the arm 14 will increase as the arm 14 moves clockwise and is about 90° when the arm strikes stop 112. Thereafter, as reel 170 continues to wind cord 72, and because housing 136 is stopped by cross plate 124 and arm 14 is stopped by stop 114, the increasing tension on the cord 72 will exert sufficient pulling force on the plug 142 to compress spring 152, with the result that the magnet 138 will move upwardly in the housing 128 far enough to release the parts 156. The conveyor is positioned with respect to the machine 2 so that when the arm 14 has been stopped by stop 112, the magnetic parts holder 74 will be directly above the bowl 4. Therefore, when the magnet 138 moves upwardly in housing 138 to release the parts 156, the parts will fall directly into the bowl 4.

Winding movement of the reel 70 is stopped as soon as the parts 156 have been released by part holder 74. Then motor 64 is reversed so as to cause pulley 70 to unwind cord 72. As the cord unwinds, the operation is exactly the reverse of what has just been described. First the plug 142 moves down out of the sleeve 128 and the magnet 138 moves downwardly in the housing 128 to the position shown in FIG. 4A. Thereafter the decreasing tension in cord 72 allows the arm 14 to be pivoted counterclockwise under the force exerted by cord 56 until it is stopped by stop 114. As soon as arm 14 has stopped moving, the cord 72 will begin to lower the magnetic parts holder 74 away from the cross-plate 124 and back down into the parts container 154 to pick up more parts.

In the preferred embodiment of the invention, the conveyor is adapted to operate automatically and repetitively through the cycle above described. Additionally, the conveyor is controlled so as to release parts into the bowl 4 only when the bowl 4 requires additional parts. Release of parts only on command is achieved by providing a limit switch LSH on the conveyor and by mounting a level sensor to the bowl 4. The limit switch LSH is shown in FIG. 3. It is mounted on the underside of the horizontal section 20 of arm 14 and includes an operating finger 158 that extends through an opening in the side wall 16 of the arm. Switch LSH is located on arm 14 so that as arm 14 reaches the end of its clockwise movement, the switch will be actuated by engagement of finger 158 with stop 114.

Referring now to FIG. 1, the level sensor may take the form of a bracket 160 attached to the bowl 4 and pivotally supporting an arm 162. Mounted on the end of arm 162 is a conventional mercury level switch LCS having terminals which are connected by leads (not shown) to the electrical control system of the conveyor which is described hereinafter. The mercury switch LCS is of the type that will close when the arm 162 is nearly or exactly vertical and will open when the arm 162 is moved to an inclined position. The arm 162 depends far enough to engage parts 156 disposed in the bottom of the bowl 4. If the level of parts 156 is relatively high, the parts will force the arm into an inclined position so that the contacts of switch LCS will be open. As the level of the parts is depleted the arm 162 drops to a more vertical position and ultimately the switch contacts close to provide a control signal to the control system of the conveyor.

Figure 6:
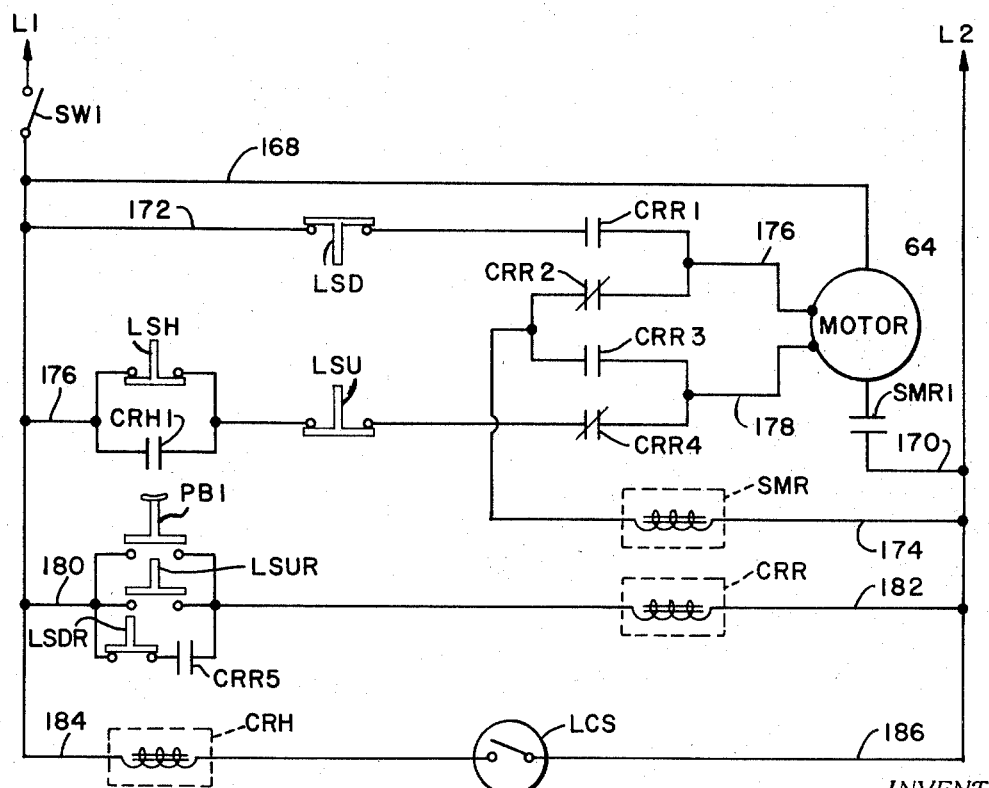
FIG. 6 is a schematic view of the electrical control circuit of the conveyor.

Referring now to FIG. 6, the control circuit includes the switches hereinabove described plus other circuit components that are conveniently housed in a case 167 (see FIG. 1) that is mounted within the housing 12. The control circuit comprises a pair of bus lines L1 and L2 adapted to be connected to an A.C. current source (not shown) and including a manually operable power switch SW1. The motor 64 is a single phase motor having a main winding and a start winding. The main winding is connected across the bus lines via leads 168 and 170 and the normally open contacts SMR1 of a motor starting relay SMR. The start winding of the motor is connected across the bus lines via a circuit arrangement described below which includes switches LSD, LSU, and LSH, plus contacts of two relays CRR and CRH and the coil of relay SMR. Relay CRR controls the direction of operation of the motor, relay SMR controls starting and stopping of the motor, and relay CRH controls continued operation of the motor after arm 14 has swung to the limit position determined by stop 112.

Switch LSD (normally closed) and contacts CRR1 (normally open) and CRR2 (normally closed) of relay CRR are connected in series across the bus lines via the coil of relay SMR and leads 172 and 174, with the junction of the two pairs of contacts being connected to one side of the motor's start winding via a lead 176. Switches LSU (normally closed) and LSD and the contacts CRR3 (normally open) and CRR4 (normally closed) of relay CRR are connected in series across the bus lines via leads 174 and 176 and the coil of relay SMR. The junction of the two pairs of contacts CRR3 and CRR4 is connected to the other side of the motor's start winding via a lead 178. Additionally, the contacts CRH1 (normally open) of relay CRH are connected across switch LSH.

Switch LSDR (normally closed), contacts CRR5 (normally open) of relay CRR, and the solenoid of relay CRR are connected in series across the bus lines via leads 180 and 182. Switch LSUR and another switch PB1 (both normally open) are connected in parallel with each other across switch LSDR and contacts CRR5. Switch PB1 is a manually operable, push-button switch of the type having a spring that urges its push-button to open position; it is used to energize relay CRR so as to close contacts CRR1 and CRR3 and thus cause the motor to unwind cord 56.

Mercury level switch LCS and the solenoid of relay CRH are connected in series with each other across the bus lines via leads 184 and 186.

Automatic operation of the machine under control of the circuit of FIG. 6 will now be described. Assume (1) that arm 14 is in the position of FIG. 3 with the motor 64 off and the permanent magnet parts holder in the position of FIG. 2 over the container 154, and (2) that switch LCS is open. Switch SW1 is closed and simultaneously the operator depresses push boton switch PB1 to energize relay CRR and thereby close contacts CRR1, CRR3, and CRR5. Current flows to the motor's starting coil through switch LSD, contacts CRR1 and CRR3 and the relay coil SMR, causing the motor to start and to drive reel 70 in a first direction to unwind cord 72 and lower the parts holder 74. This downward movement continues until the parts holder 74 is impeded by its contact with parts in container 154 and cord 72 has become slack enough to allow pulley 73 to drop and open switches LSD and LSDR. Opening of switch LSD stops the motor. Opening of switch LSDR causes relay CRR to drop out so that its contacts CRR1, CRR3 reopen and contacts CRR2, CRR4 reclose. As a result, current flows to the starting coil of the motor via switches LSH, LSU and contacts CRR2, CRR4 so as to cause the motor to rotate in a second opposite direction to wind cord 72 on reel 70. The permanent magnet parts holder will rise up out of the container 154 with parts 156 magnetically held thereto and the increased tension on cord 72 will cause pulley 74 to move up far enough to allow switches LSD and LSDR to reclose. The arm 14 will remain stationary against stop 114 until the parts holder 74 reaches the position shown in FIG. 4A where it is stopped by engagement of its resilient pad 148 with the cross plate 114. At this point spring 150 will prevent the magnet 134 from moving away from the bottom end of the housing 128 and the increasing tension in cord 72 will cause the arm 124 to swing clockwise (as seen in FIG. 3) until it engages stop 112. At the same time, switch LSH is opened. Since switch LCS is also open, (indicative of an ample supply of parts in feeder bowl 4), the solenoid of relay CRH is deenergized and contacts CRH1 are open. Accordingly, the opening of switch LSH interrupts the circuit to the motor through switch LSU and contacts CRR4 and CRR2, causing the motor to stop with arm 14 held against stop 112 and the parts holder held in the position of FIG. 4A. Assuming that the machine 2 is operating, parts will continue to be fed out of bowl 4 until eventually the level of parts in the bowl will be low enough to allow the mercury switch LCS to close. When this occurs, relay CRH is energized to close contacts CRH1 thereby reestablishing current flow to the motor through switch LSU and contacts CRR4 and CRR2. The motor then continues to wind cord 72 on pulley 74. Since arm 14 cannot move further in a clockwise direction, the resumed winding of cord 72 produces a cord tension sufficient to overcome spring 150, with the result that the magnet is pulled away from the bottoms end of housing 128 far enough (see FIG. 4B) to release the parts 156 into bowl 4. At the same time the plug 138 moves up in sleeve 118 far enough to cam switch fingers 132 of switches LSU and LSUR outwardly of the sleeve, with the result that these switches are opened and closed respectively. Opening of switch LSU stops current flow to the motor through contacts CRH1, CRR4 and CRR2. Closing of switch LSUR causes the solenoid of relay CRR to be energized, thereby opening contacts CRR2 and CRR4 and closing contacts CRR1, CRR3, and CRR5. Since switch LSDR is closed, the closing of contacts CRR5 establishes a holding circuit for relay CRR. Since switch LSD is closed, the closing of contacts CRR1 and CRR3 causes current to be supplied to the motor's start coil in a direction to make the motor unwind cord 72. As the cord 72 unwinds, the following occurs: first plug 138 moves down in sleeve 118 to restore the magnet to the position of FIG. 4A and to reclose and reopen switches LSU and LSUR respectively; second, arm 14 begins to swing counterclockwise and this movement allows switch LSH to reopen; third, arm 14 is stopped by stop 114; fourth, the parts holder 74 drops down into container 154; fifth, the parts holder is stopped by parts in the container and, since the motor is still unwinding cord 72, the cord becomes slack; sixth, the slack in cord 72 causes pulley 72 to drop and reopen switches LSD and LSDR; seventh, opening of switch LSD stops the motor and opening of switch LSDR causes the relay CRR to drop out; and eighth, as soon as relay CRR drops out, current flow to the motor is resumed through switches LSH and LSU and contacts CRR4 and CRR2. Thereafter the machine continues to operate as above described except that operation of the motor will not be interrupted when arm 14 is stopped by stop 112 and switch LSH is reopened if relay CRH is energized at that time due to there being an unsufficient supply of parts in the bowl to cause mercury switch LCS to be closed. If the latter switch is open, the motor will stop when switch LSH is opened and will remain off until enough parts have been removed from the bowl to cause switch LCS to close.

It is believed to be apparent that the invention as above described and illustrated is adapted to automatically compensate for the height of parts in the supply or storage container 54 and also permits containers to be stacked one above the other, with no need to shut down the conveyor or manually adjust any controls in order to allow the conveyor to keep operating effectively as each container in the stack is emptied and removed to expose the parts in the next lower container. A further advantage is that the conveyor can be made in various sizes and capacities without any fundamental change in design or mode of operation. Furthermore, it is possible to modify the control circuit so as to permit the machine to be controlled manually. The conveyor may be used with various machines and the ability to operate only on demand afforded by mercury switch LCS may be achieved in other ways, e.g., by means of a transducer adapted to weigh the contents of the supply hopper of a machine and to close a switch when the measured weight of parts in the supply hopper falls below a predetermined minimum. It also is recognized that a reversible d.c. electric motor may be used in place of motor 64.

What is claimed is:

1. A conveyor for lifting, transporting and releasing parts susceptible of magnetic attraction comprising:
   an arm;
   support means pivotedly supporting said arm for swinging movement;
   rotatable winding means;
   a flexible cord having one end connected to said winding means so that said cord may be wound or unwound by said winding means according to the direction of rotation thereof;
   reversible drive means for said winding means;
   a plurality of pulleys of which at least one is mounted to said support means and at least one is mounted to said arm;
   a parts holder comprising a member having a surface to which said parts may be held under the influence of a magnetic field, a magnet capable of limited movement toward and away from said surface, and means biasing said magnet toward said magentic surface, and means connecting the opposite end of said cord to said magnet so that said parts are suspended from said cord and tension on said cord opposes said biasing means;
   a plurality of cord guiding means of which at least one is mounted to said support means and at least one is mounted to said arm, said cord extending from said winding means to said magnet assembly along a path determined by its engagement with said cord guiding means;
   stop means on said arm in position to be engaged by said parts holder member and thereby limit movement of said member toward said arm when said cord is being wound by said winding means;
   means for limiting swinging movement of said arm between first and second limit positions;
   said cord guiding means being disposed so that when said cord is under tension it exerts a turning force on said arm that urges said arm toward said second limit position; and
   arm biasing means biasing said arm toward said first limit position, said biasing means providing a turning force on said arm that exceeds the turning force exerted by said cord when it is under tension as long as said parts holder member is disengaged from said stop means and is less than the turning force exerted by said cord when said winding means is operating to wind said cord with said parts holder member in engagement with said stop means;
   said magnet biasing means exerting a biasing force on said magnet which is greater than the turning force required to be exerted by said cord on said arm in order to overcome the force exerted by said arm biasing means and move said arm to said limit position, whereby said magnet cannot be pulled away from said surface by said cord until said arm has been stopped in said second limit position.

2. A conveyor according to claim 1 further including:

means for operating said drive means so as to sequentially (a) unwind said cord until it is slack due to said parts holder being in engagement with said parts to be lifted and transported, (b) stop unwinding and start winding said cord, (c) continue winding said cord so that said arm is forced to swing to said second limit position and said magnet is caused to move away from said surface after said arm has reached said second limit position, and (d) stop winding and start unwinding said cord so as to allow said magnet to move back to its original position with respect to said surface and thereafter allow said arm to return to said first limit position.

3. A conveyor according to claim 1 wherein said arm biasing means comprises a second cord connected to said arm, and means including a counterweight connected to said second cord for causing said second cord to urge said arm toward said first limit position.

4. A conveyor according to claim 1 wherein said drive means is a reversible electric motor and said operating means comprises an electrical circuit for controlling operation of said motor, said circuit including limit switch means for stopping operation of said motor and additional switch means for reversing said motor.

5. A conveyor according to claim 4 wherein said circuit has two limit switches and said additional switch means comprises two reversing switches, and further including means for operating one limit and one reversing switch when said cord becomes slack and means for operating the other limit and reversing switches when a predetermined amount of said cord has been wound by said winding means.

6. A conveyor according to claim 5 further including another limit switch that is operated when said arm is swung to said second limit position.

7. A conveyor according to claim 4 mounted so as to discharge parts into a hopper, and means for controlling operation of said drive means according to the supply of parts in said hopper.

8. A conveyor according to claim 7 wherein said hopper is a bowl mounted on a vibrator, and said last mentioned means comprises a parts level sensor comprising a moveable member mounted so as to change position according to the level of parts in said bowl, and a switch that opens or closes according to the position of said moveable member.

9. A conveyor according to claim 7 wherein said hopper is part of an article counting machine.

10. In combination with an article counting machine having a vibrating bowl feeder, a conveyor for delivering parts to said bowl feeder, said conveyor comprising:
an arm;
means pivotally mounting said arm for swinging movement in a substantially horizontal plane;
a permanent magnet parts holder including a housing, a permanent magnet within said housing; and spring means holding said magnet close to a surface of said housing;
a reversible cord winding mechanism;
a flexible cord having one end connected to said magnet and its opposite end connected to said winding mechanism;
means on said arm for supporting said cord so that said parts holder is suspended from said arm by said cord;
means for limiting swinging movement of said arm between a first parts loading position and a second parts releasing position above said bowl feeder;
biasing means for applying to said arm a turning force that urges said arm to said first parts loading position;
cord guiding means arranged so that when said cord is under tension it applies to said arm a turning force that urges said arm to said second parts releasing position; and
stop means for stopping movement of said parts holder toward said arm when said cord is being wound.

11. A conveyor according to claim 10 further including:
means for operating said winding mechanism so that said cord first lifts said parts holder until said parts holder is stopped by said stop means, then pulls said arm to said second parts releasing position, next pulls said magnet away from said housing surface, then allows said magnet to move back to its original position with respect to said housing surface, next allows said arm to be pulled back to said first parts loading position by said biasing means, and finally relowers said parts holder.

* * * * *